United States Patent
Sohn (10) Patent No.: US 8,513,824 B2
(45) Date of Patent: Aug. 20, 2013

(54) SUSPENSION SYSTEM FOR VEHICLE

(76) Inventor: Chun Shig Sohn, Toronto (CA)

( * ) Notice: Subject to any disclaimer, the term of this patent is extended or adjusted under 35 U.S.C. 154(b) by 613 days.

(21) Appl. No.: 12/725,253

(22) Filed: Mar. 16, 2010

(65) Prior Publication Data

US 2011/0227425 A1    Sep. 22, 2011

(51) Int. Cl.
*F02B 71/00*    (2006.01)

(52) U.S. Cl.
USPC ......................................... 290/1 R; 180/65.31

(58) Field of Classification Search
USPC .................. 290/1 R, 42; 310/17, 30; 322/89
See application file for complete search history.

(56) References Cited

U.S. PATENT DOCUMENTS

| | | | | |
|---|---|---|---|---|
| 4,900,054 A | * | 2/1990 | Kessler ....................... | 280/5.507 |
| 5,337,560 A | * | 8/1994 | Abdelmalek .................... | 60/370 |
| 6,841,970 B2 | * | 1/2005 | Zabramny ..................... | 320/101 |
| 6,952,060 B2 | | 10/2005 | Goldner et al. | |
| 7,261,171 B2 | * | 8/2007 | de la Torre et al. ......... | 180/65.31 |
| 7,688,036 B2 | * | 3/2010 | Yarger et al. .................. | 320/137 |
| 2006/0125325 A1 | | 6/2006 | Beaulieu | |
| 2008/0277939 A1 | | 11/2008 | Richardson et al. | |
| 2010/0028727 A1 | | 2/2010 | Hortop et al. | |
| 2011/0202236 A1 | * | 8/2011 | Galasso et al. .................. | 701/37 |

OTHER PUBLICATIONS

International Search Report and Written Opinion from International Application No. PCT/CA2010/002004 dated Apr. 18, 2011.
Amir Hossein Eghbali, et al., "Using ultracapacitors for saving energy in regenerative braking in hybrid vehicles" PHEV2007 Conference, Winnipeg, Manitoba Canada Nov. 1-2, 2007 [online: http://umanitoba.ca/outreach/conferences/phev2007/PHEV2007/proceedings/PluginHwy_PHEV2007_PaperReviewed_Hossein.pdf].
Paul Evans, "Regeneration no longer just about breaking" Gizmag.com Jan. 1, 2009 [online: http://www.gizmag.com/regeneration-no-longer-just-about-braking/10640/].
"The Bose Suspension System: Resolving the conflict between comfort and control—The System" The Bose Corporation, 2008 [Online: http://www.bose.com/controller?event=View_Static_Page_Event &url=/learning/project_sound/suspension_components.jsp].
Bo Gao "Postgraduate Series: Development of a Novel Hydro-Pneumatic Active Suspension" Jul. 28, 2007 [Online: http://blog.naver.com/innaha?Redirect=Log&logNo=70020260852].

* cited by examiner

*Primary Examiner* — Michael Zarroli
(74) *Attorney, Agent, or Firm* — Workman Nydegger (57) ABSTRACT

Disclosed are an apparatus, a system, and a method for suspension of a vehicle. An electromagnetic generator generates an electrical energy in response to a relative movement between a vehicle body and a wheel assembly. A storage device stores the electrical energy generated from the electromagnetic generator.

22 Claims, 5 Drawing Sheets

SUSPENSION SYSTEM FOR VEHICLE

BACKGROUND

A suspension system is the system of springs, shock absorbers and linkages that connects a vehicle to its wheels. A suspension system contributes to a vehicle's roadholding/handling and braking for good active safety, and driving pleasure, and keeping vehicle occupants comfortable and reasonably well isolated from road notice, bumps, and vibration, etc.

DETAILED DESCRIPTION

In one embodiment, a suspension system for a vehicle includes an electromagnetic generator configured to generate an electrical energy in response to a relative movement between a vehicle body and a wheel assembly of a vehicle, and a storage device, coupled to the electromagnetic generator, configured to store the electrical energy generated from the electromagnetic generator. The storage device is configured to be instantaneously charged and discharged.

The storage device may include one or more ultracapacitors, or one or more electric double layer capacitors (ELDCs).

The system may further include a DC-to-DC converter coupled between the electromagnetic generator and the storage device to convert an output voltage of the electromagnetic generator to an allowable range of an input voltage for the storage device. The allowable range of the input voltage for the storage device may be between about 300V to 400V.

The system may further include a sensor configured to detect the relative movement between the vehicle body and the wheel assembly. The system may further include a controller configured to control the electromagnetic generator to operate in response to the detected relative movement between the vehicle body and the wheel assembly.

The electromagnetic generator may include a permanent magnet enclosed with a coil and an exciter to apply an exciting voltage between both ends of the coil. The permanent magnet may be interlocked with the vehicle body and the coil may be interlocked with the wheel assembly. The permanent magnet may include a rare earth alloy magnet. The electromagnetic generator may convert the relative movement between the vehicle body and the wheel assembly to the electrical energy.

In another embodiment, an apparatus includes an electromagnetic generator configured to generate an electrical energy in response to a relative movement between a first mechanical part and a second mechanical part such that the relative movement is attenuated by the generation of the electrical energy, and one or more ultracapacitors, coupled to the electromagnetic generator in parallel, configured to store the electrical energy generated from the electromagnetic generator.

The apparatus may further include a sensor configured to detect the relative movement between the first mechanical part and the second mechanical part. The apparatus may further include a controller configured to control the electromagnetic generator to operate in response to the detected relative movement. The electromagnetic generator may include a permanent magnet enclosed with a coil and an exciter to apply an exciting voltage between both ends of the coil. The permanent magnet may be interlocked with the first mechanical part and the coil may be interlocked with the second mechanical part. The apparatus may include a shock absorber or a buffer.

In still another embodiment, a method for suspension includes converting a relative movement between a vehicle body and a wheel assembly of a vehicle to an electrical energy, and instantaneously storing the electrical energy. The relative movement between the vehicle body and the wheel assembly of the vehicle is attenuated.

An electromagnetic interaction between a magnet and a coil can be used in response to the relative movement and the electromagnetic interaction may be converted to the electrical energy in order to convert the relative movement to the electrical energy. The magnet and the coil may be included in the vehicle such that the magnet is interlocked with the vehicle body and the coil is interlocked with the wheel assembly. The method may further include detecting the relative movement between the vehicle body and the wheel assembly by sensing an amount of displacement of the vehicle body and/or an amount of displacement of the wheel assembly, and producing a detection value representing the detected relative movement of the vehicle body with respect to the wheel assembly. The method may further include controlling the conversion of the relative movement to be initiated in response to the detection value.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
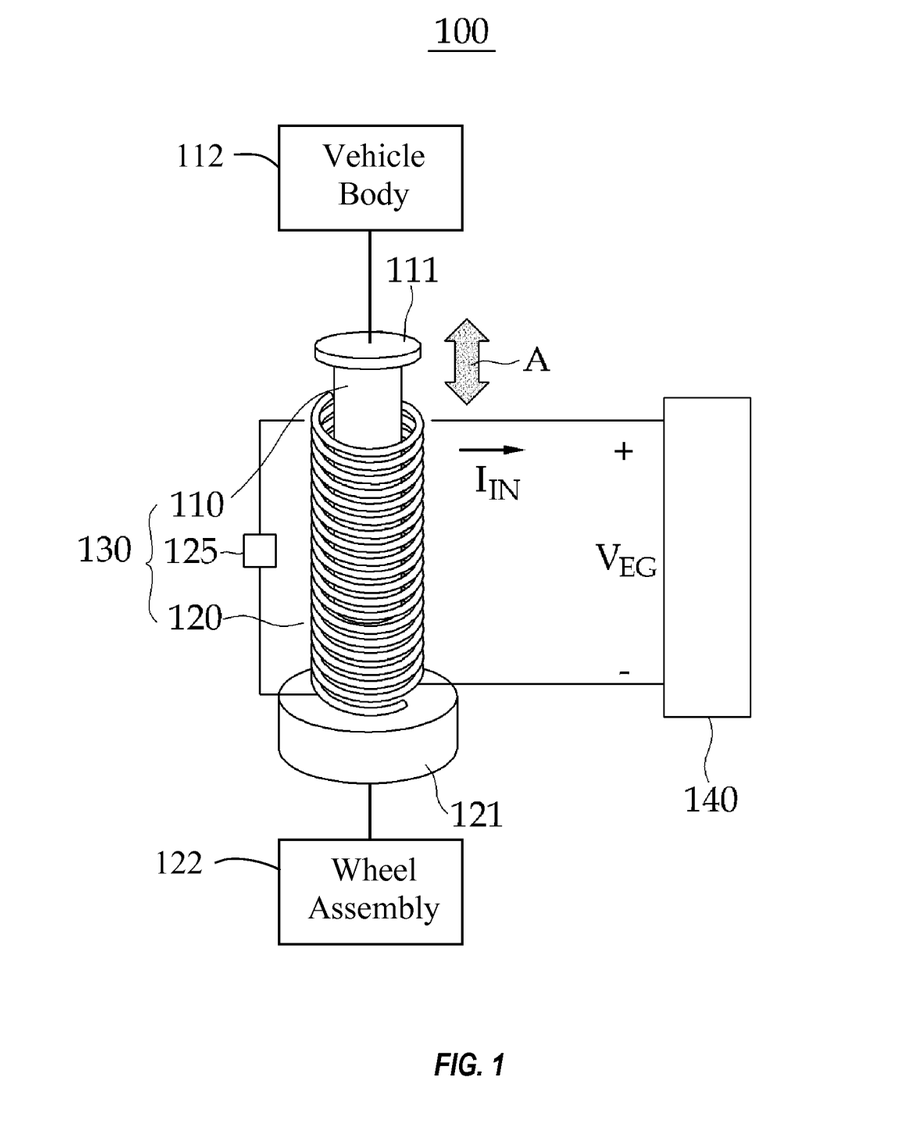
FIG. 1 is a schematic diagram of an illustrative embodiment of a suspension system for a vehicle.

FIG. 1 is a schematic diagram of an illustrative embodiment of a suspension system for a vehicle. As used herein, a vehicle may include any mechanical means for conveyance, carriage or transport, such as a bicycle, a car, a motorcycle, or a train. Particularly, a vehicle may include a two-wheeled vehicle or a four-wheeled vehicle, without limitation. Further, the vehicle may include an electrical vehicle or a hybrid vehicle that uses two or more distinct power sources, for example, electricity and gasoline, bio diesel, conventional diesel or liquefied gas, to move the vehicle. Hereinafter, a suspension system for a four-wheeled vehicle will be described for the simplicity of description. A four wheeled vehicle includes a vehicle body and wheel assemblies (for example, four (4) wheel assemblies for the four-wheeled vehicle). Each of the wheel assemblies may include a wheel and a linkage to provide a connection between the wheel and the vehicle body. A suspension system can be provided between the vehicle body and each of the wheel assembly.

FIG. 1 illustrates a suspension system 100 for a vehicle including an electromagnetic generator 130 configured to generate an electrical energy and a storage device 140 configured to store the electrical energy generated from electromagnetic generator 130. Electromagnetic generator 130 may be provided for each of wheel assemblies and thus four (4) electromagnetic generators can be provided for the four-wheeled vehicle. For the simplicity for description, FIG. 1 illustrates one electromagnetic generator 130.

In one embodiment, electromagnetic generator 130 includes a permanent magnet 110 enclosed with a coil 120 and an exciter 125 to apply an exciting voltage between both ends of coil 120 to initiate an operation of electromagnetic generator 130.

As used herein, the "exciting voltage" refers to a voltage applied between both ends of coil 120 to electrically excite coil 120 to be in a state where a current can be induced in coil 120 in response to a relative movement of permanent magnet 110, as will be described later. Permanent magnet 110 includes a mechanical connection 111 with the vehicle body (not shown) such that permanent magnet 110 is interlocked with the vehicle body. Since permanent magnet 110 is interlocked with the vehicle body 112 through mechanical connection 111, a movement of permanent magnet 110 is affected by a movement of the vehicle body. For example, the vehicle body may move in a longitudinal direction when the vehicle goes over a bump, a pothole or roughness of a road. Such movement of the vehicle body affects the movement of permanent magnet 110 interlocked with the vehicle body. For example, when the vehicle goes over a bump, the vehicle body can vibrate and show a vertical reciprocating motion due to the existence of the bump. At this time, since permanent magnet 110 is interlocked with the vehicle body 112 permanent magnet 110 is affected by the vibration of the vehicle body, and thus, can also show a vertical reciprocating motion.

In some embodiments, permanent magnet 110 may include a rare earth alloy magnet. The rare earth alloy magnet may include a samarium-cobalt magnet or a neodymium magnet, without limitation. Coil 120 includes a mechanical connection 121 with the wheel assembly 122 such that coil 120 is interlocked with the wheel assembly 122. Since coil 120 is interlocked with the wheel assembly, its movement is affected by a movement of the wheel assembly. For example, when the vehicle goes over a pothole of a road, since the wheel assembly goes along with a surface of the road having the pothole, the wheel assembly moves slightly down when going over the pothole. At this time, since coil 120 is interlocked with the wheel assembly, coil 120 is affected by the movement of the wheel assembly, and thus, can also move down at the pothole. In some embodiment, coil 120 may include a conductive material, such as steel, stainless steel, copper or aluminum, without limitation. Exciter 125 applies an exciting voltage between both ends of coil 120 thereby electromagnetic generator 130 operates to generate an electrical energy in response a relative movement between the vehicle body and the wheel assembly, as will be described hereinafter. As used herein, the term "relative movement" refers to the movement in the longitudinal direction with respect to the wheel assembly, which causes the relative movement between permanent magnet 110 and coil 120, which will be described in detail hereinafter.

When the vehicle goes over a road disturbance, such as a bump, a pothole, roughness of a road, or any obstacle of the road or stops or starts up, the vehicle body gets a physical shock or an impact by such road disturbance or stop and start-up operations, and thus, the vehicle body vibrates in a longitudinal direction. Therefore, permanent magnet 110 which is interlocked with the vehicle body shows a vertical reciprocating motion (for example, "A" shown in FIG. 1) with respect to coil 120 which encloses permanent magnet 110, and thus, is also interlocked with the wheel assembly. Hereinafter, the vertical reciprocating motion or the movement in the longitudinal direction (for example, moving-up and/or moving-down of permanent magnet 110) with respect to coil 120 may be referred as "relative movement of permanent magnet 110 with respect to coil 120" or "relative movement between permanent magnet 110 and coil 120."

In some embodiment, the relative movement between the vehicle body and the wheel assembly, that is, the vertical reciprocating motion of the vehicle body with respect to the wheel assembly, may cause the relative movement between permanent magnet 110 and coil 120 interlocked with the vehicle body and the wheel assembly. Then, in response to the relative movement of permanent magnet 110 with respect to coil 120, exciter 125 applies the exciting voltage across coil 120 and the relative movement of permanent magnet 110 causes a change in magnetic flux around permanent magnet 110 such that an electromotive force is induced on coil 120 based on Faraday's Law. Thus, a current ($I_{IN}$) is induced and flows in coil 120 to oppose the polarity of the induced electromotive force based on Lenz's Law. Therefore, an electric power (that is, an electrical energy, P) is generated by the induced current ($I_{IN}$) and an output voltage ($V_{EG}$) of electromagnetic generator 130 ($P=I_{IN} \cdot V_{EG}$). Electrical energy P can be stored in a storage device (for example, storage device 130) to be used to drive and/or to operate the vehicle. In one embodiment, exciter 125 may include an exciting coil which is enclosed by coil 120. The exciting coil can apply the exciting voltage between both ends of coil 120 with changing a polarity of the exciting voltage thereby maintaining a polarity of an output voltage of coil 120 (that is, output voltage ($V_{EG}$) of electromagnetic generator 130) to be constant. For example, the exciting coil applies a positive voltage between both ends of coil 120 when permanent magnet 110 goes up, whereas the exciting coil applies a negative voltage between both ends of coil 120 when permanent magnet 110 goes down. Then, the output voltage of coil 120 can be maintained to be positive when permanent magnet 110 moves up and down.

In another embodiment, electromagnetic generator 130 may attenuate the relative movement between permanent magnet 110 and coil 120 by converting the relative movement into the electrical energy as described above. Accordingly, any shock, vibration or deviation in a longitudinal direction can be attenuated (or absorbed) by converting the relative movement that has been occurred by the shock, vibration or deviation into an electrical energy, and thus, vehicle occupants keep comfort even in the described circumstance. As such, the generation of the electrical energy can allow the storage of the electrical energy, as well as the attenuation of the relative movement between the vehicle body and the wheel assembly.

Storage device 140 is electrically coupled to electromagnetic generator 130 to store the electrical energy generated from electromagnetic generator 130. Storage device 140 may be instantaneously charged and discharged. In some embodiment, storage device 140 may include an ultracapacitor or an electric double layer capacitor (ELDC), without limitation. The ultracapacitor or ELDC is known to have a capability of being charged and discharged instantaneously. For example, charge time and discharge time may be ranged between about 0.1 and 60 seconds or about 0.3 and 30 seconds. Also, the ultracapacitor or ELDC can be charged and discharged repeatedly without performance deterioration. For example, the ultracapacitor or ELDC can be charged and discharged repeatedly, for example, more than 10,000 times or more than 500,000 times. As such, storage device 140, such as ultracapacitor or ELDC, can store the electrical energy generated from electromagnetic generator 130 instantaneously, and can be repeatedly charged with the electric energy in response to the relative movement between permanent magnet 110 and coil 120, as well as being discharged so that the stored electrical energy can be used to drive and/or operate the vehicle. In another embodiment, storage device 140 can include a multiple number of ultracapacitors or ELDCs which are serially connected each other. The serially connected ultracapacitors or ELDCs can be electrically coupled to electromagnetic generator 130 in parallel. Storage device 140 can include, for example, one hundred (100) to one hundred and fifty (150) ultracapacitors or ELDCs.

Figure 2:
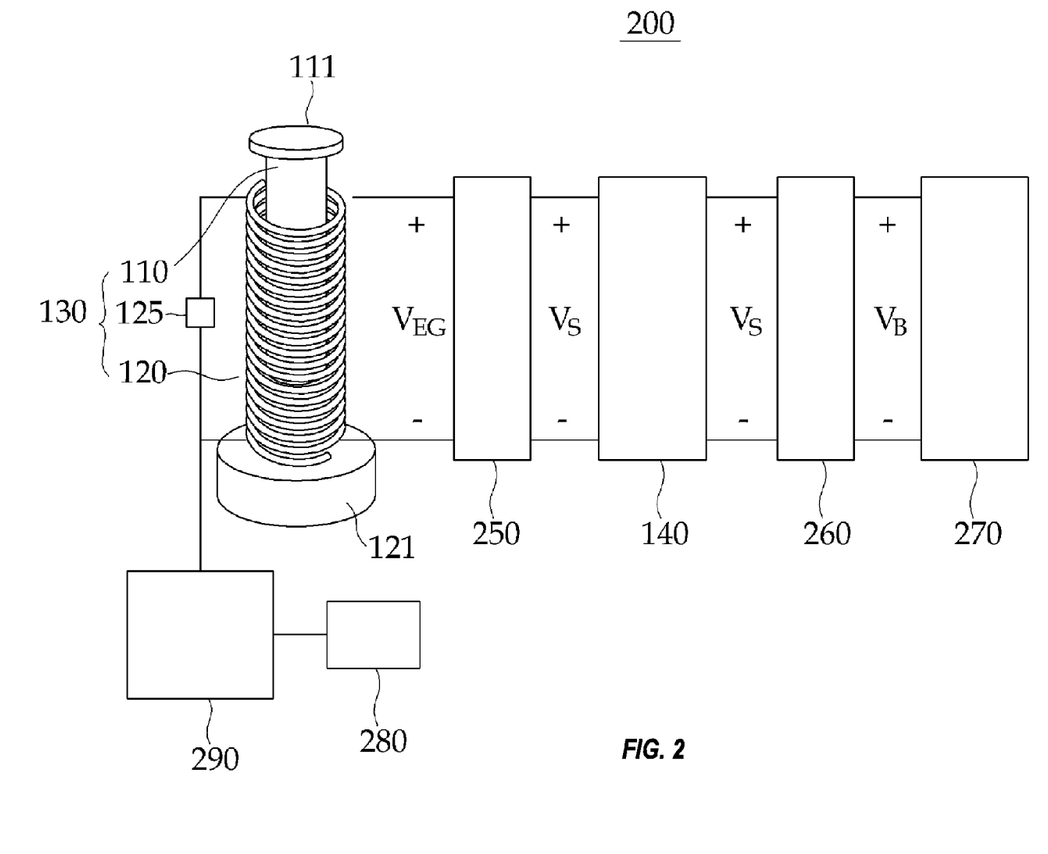
FIG. 2 is a schematic diagram of another illustrative embodiment of a suspension system for a vehicle.

FIG. 2 is a schematic diagram of another illustrative embodiment of a suspension system for a vehicle. A system 200 includes electromagnetic generator 130, storage device 140, two DC-to-DC converters 250 and 260 electrically coupled between electromagnetic generator 130 and storage device 140 and between storage device 140 and a battery 270, respectively, battery 270 configured to provide a vehicle with a power, a sensor 280 configured to detect the relative movement between the vehicle body and the wheel assembly and a controller 290 configured to control electromagnetic generator 130 in response to the detected relative movement. The same elements as those of FIG. 1 are denoted as the same reference numerals as FIG. 1 and explanations on the same elements will be omitted.

DC-to-DC converter 250 converts the output voltage ($V_{EG}$) of electromagnetic generator 130 to an allowable range of an input voltage (Vs) for storage device 140. By way of an example, the output voltage ($V_{EG}$) can be hundreds of volt (V), for example, between about 200V to 800V. By DC-to-DC converter 250, such output voltage ($V_{EG}$) can be converted to allowable range of the input voltage (Vs) for storage device 140, such as ultracapacitors which are serially connected. For example, if the output voltage ($V_{EG}$) of electromagnetic generator 130 is 300V and the input voltage (Vs) of storage device 140 is ranged between 360V to 390V (where storage device 140 includes serially connected one hundred and forty four (144) ultracapacitors each having an input voltage of 2.5V to 2.7V), DC-to-DC converter 250 can convert the output voltage ($V_{EG}$) of electromagnetic generator 130 (300V) to the input voltage (Vs) for storage device 140 (360V to 390V). Battery 270 is a power source for a vehicle. For example, battery 270 can include an electrochemical battery, such as a lead-acid battery. DC-to-DC converter 260 can be electrically coupled between storage device 140 and battery 270 to convert an output voltage (which can be identical to the input voltage (Vs)) of storage device 140 to an allowable range of voltage for battery 270. By way of example, since an input voltage ($V_B$) for battery 270 can be ranged between about 100V to 1000V, or about 200V to 500V, DC-to-DC converter 260 converts the output voltage (Vs) of storage device 140 to the input voltage ($V_B$) of battery 270.

Sensor 280 may be configured to detect and to measure a force exerted on the vehicle. In one embodiment, sensor 280 may include a multiple number of sensing elements each of which detects and measures different detection values. For example, sensor 280 may include a sensing element to detect an amount of displacement of the vehicle body and an amount of displacement of the wheel assembly. By way of example, sensor 280 may include a magnetic field sensor which can detect a displacement amount of an object based on a change of a magnetic field around of the object. With the detected amounts of displacement of the vehicle body and the wheel assembly, sensor 280 may detect a relative movement between the vehicle body and the wheel assembly and produce a detection value for the detected relative movement. In some embodiments, sensor 280 may further include a sensing element to detect a side-to-side force acting on the vehicle, a sensing element to detect a fore-and-aft force acting on the vehicle and/or a sensing element to detect a force exerted by each wheel of the vehicle, without limitation. It will be apparent to one of skill in the art that any number of sensors and any configuration of sensor 280 can be applicable for apparatus 200 as long as sensor 280 is configured to detect the relative movement between the vehicle body and the wheel assembly.

Controller 290 can control electromagnetic generator 130 to operate in response to the detected relative movement between the vehicle body and the wheel assembly. For example, controller 290 receives the detection value for the relative movement between the vehicle body and the wheel assembly from sensor 280 and sends an instruction to electromagnetic generator 130 to initiate its operation. Sensor 280 produces the detection value by sensing an amount of displacement of the vehicle body and/or an amount of displacement of the wheel assembly. By way of example, the detection value can be a displacement amount of permanent magnet 110 with respect to coil 120.

In response to the instruction from controller 290, exciter 125 of electromagnetic generator 130 applies the exciting voltage between both ends of coil 120, and, thus, an electrical energy can be generated by the relative movement between permanent magnet 110 and coil 120.

In some embodiments, controller 290 may be a dedicated controller for electromagnetic generator 130 or an electric control unit (ECU) to control other electrical devices of the vehicle as well as electromagnetic generator 130.

Figure 3:
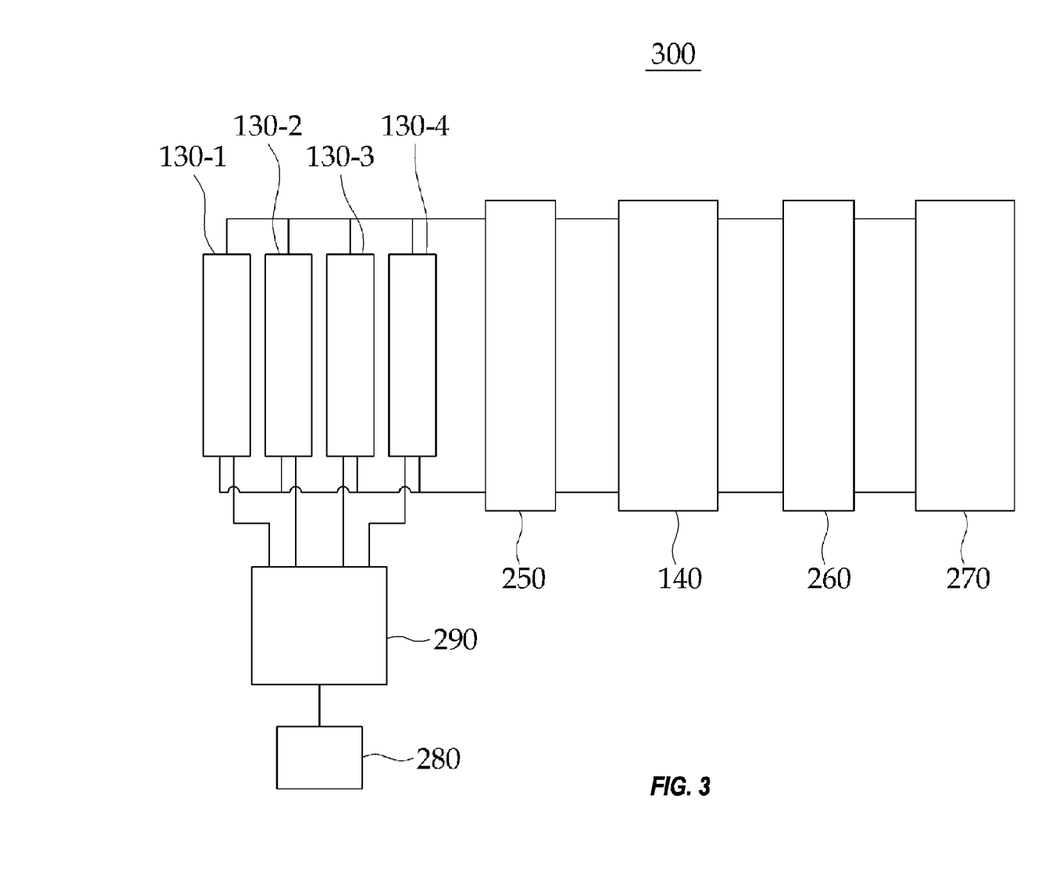
FIG. 3 is a schematic diagram of still another illustrative embodiment of a suspension system for a vehicle.

FIG. 3 illustrates still another illustrative embodiment of a suspension system 300 including one or more electromagnetic generators (for example, electromagnetic generators 130-1, 130-2, 130-3 and 130-4), storage device 140, DC-to-DC converters 250 and 260, a battery 270, sensor 280 and controller 290. Suspension system 300 is different from suspension systems 100 and 200 in that a multiple number of electromagnetic generators are provided. The same elements as those of FIG. 1 or 2 are denoted as the same reference numerals as FIG. 1 or 2 and explanations on the same elements will be omitted. FIG. 3 illustrates suspension system 300 including four (4) electromagnetic generators 130-1, 130-2, 130-3 and 130-4, but the number of electromagnetic generators is not limited thereto.

In one embodiment, each of electromagnetic generators 130-1, 130-2, 130-3 and 130-4 can be provided for each wheel assembly of four-wheeled vehicle, and be electrically coupled to a common storage device (for example, storage device 140), respectively. The electrical energy generated from electromagnetic generators 130-1, 130-2, 130-3 and 130-4 are stored in storage device 140 through DC-to-DC converter 250. In one embodiment, electromagnetic generators 130-1, 130-2, 130-3 and 130-4 can be connected in parallel as illustrated in FIG. 3. In this embodiment, the exciting voltage applied to each of electromagnetic generators 130-1, 130-2, 130-3 and 130-4 can be identical. An amount of the electrical energy generated from each of electromagnetic generators 130-1, 130-2, 130-3 and 130-4 can be different in accordance with an amount of relative movement of each of the permanent magnets with respect to the corresponding one of the coils. For example, electromagnetic generator 130-1 can generate a greater electrical energy than that of electromagnetic generator 130-2 if the corresponding wheel for electromagnetic generator 130-1 goes over a higher bump than the corresponding wheel for electromagnetic generator 130-2 so that the amount of the relative movement between the permanent magnet and the coil of electromagnetic generator 130-1 is more than the amount of that of electromagnetic generator 130-2. In another embodiment, an electrical energy generated from electromagnetic generators 130-1, 130-2, 130-3 and 130-4 can be independently stored in storage devices. For example, four (4) storage devices can be provided and each storage device can electrically be connected to each electromagnetic generator to store the electrical energy from each electromagnetic generator. Further, electromagnetic generators 130-1, 130-2, 130-3 and 130-4 can operate independently in response to an individual instruction sent from controller 290.

Although illustrated with respect to the vehicle, one of skill in the art could understand that other apparatuses can be applicable as long as the apparatuses include a first mechanical part and a second mechanical part showing a relative movement. For example, an apparatus may include an electromagnetic generator configured to generate an electrical energy in response to a relative movement between a first mechanical part and a second mechanical part, and one or more ultracapacitors (or ELDCs) coupled to the electromagnetic generator to store the electrical energy generated from the electromagnetic generator. The electromagnetic generator includes a permanent magnet enclosed with a coil and an exciter to apply an exciting voltage between both ends of the coil. The permanent magnet is interlocked with the first mechanical part and the coil is interlocked with the second mechanical part. The relative movement can be attenuated by the generation of the electrical energy. Herein, the "relative movement" can refer to a movement in any direction (for example, a longitudinal direction) or a vertical reciprocating motion of the first mechanical part with respect to the second mechanical part. This apparatus can be used to absorb and/or attenuate any shock, vibration or deviation. For example, the apparatus can be a shock absorber or a buffer.

Figure 4:
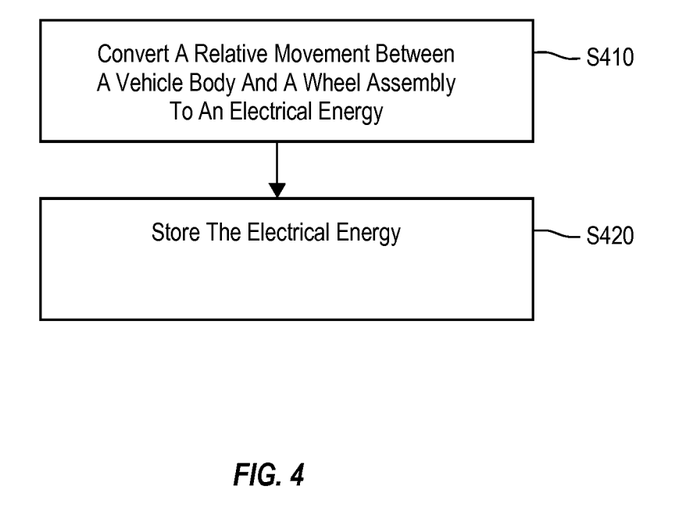
FIG. 4 is a flow chart illustrating an illustrative embodiment of a method for suspension.

Referring FIGS. 1 and 4, an example method for suspension of a vehicle is illustrated. FIG. 4 is a flow chart illustrating an illustrative embodiment of a method for suspension of a vehicle. When a vehicle goes over a bump, a pothole or roughness of a road surface, the vehicle moves up and down and causes a relative movement between a vehicle body and a wheel assembly. In one embodiment, the relative movement between the vehicle body and the wheel assembly can be converted to an electrical energy by electromagnetic generator 130 provided in the vehicle, as described above, with respect to FIG. 1, and, thus, the relative movement can be attenuated (S410). Particularly, the electrical energy can be generated by the operation of electromagnetic generator 130, particularly, by the electromagnetic interaction between permanent magnet 110 interlocked with the vehicle body and coil 120 interlocked with the wheel assembly, of electromagnetic generator 130. Since electromagnetic generator 130 is electrically coupled to storage device 140, the generated electrical energy is instantaneously stored in storage device 140 (S420). Storage device 140 can include the ultracapacitor or the ELDC as described above. Since the ultracapacitor or ELDC does not include a chemical reaction when charged and/or discharged, compared with other capacitors, it is known to have a characteristic of instantaneously being charged and/or discharged. The electrical energy stored in storage device 140 can be used to drive and/or operate the vehicle.

Figure 5:
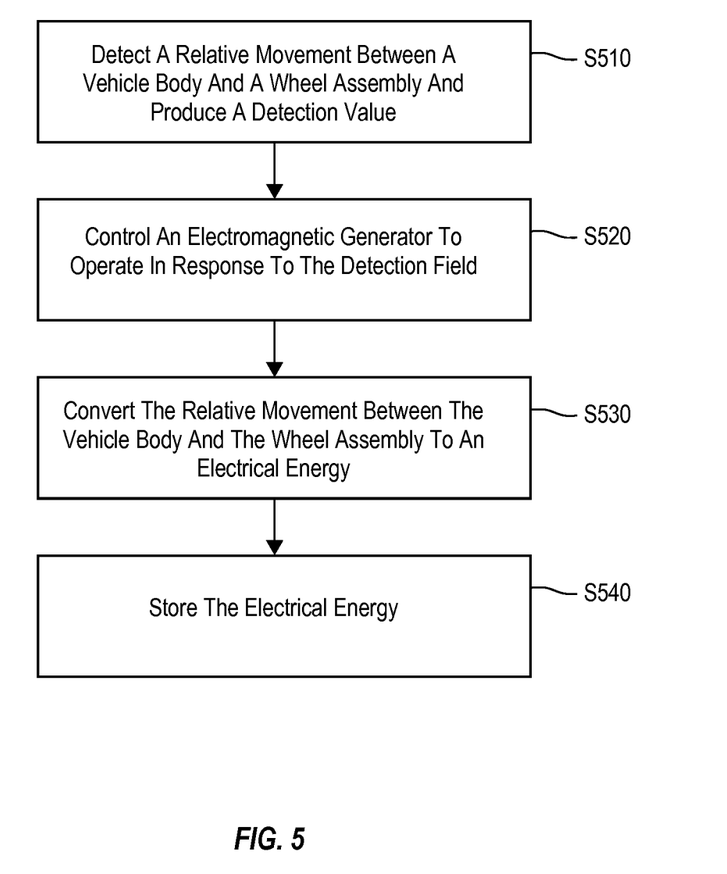
FIG. 5 is a flow chart illustrating another illustrative embodiment of a method for suspension.

Referring FIG. 2 or 3, and 5, another example method for suspension of a vehicle is illustrated. FIG. 5 is a flow chart showing another illustrative embodiment of a method for suspension of a vehicle. When a vehicle goes through a road disturbance, a relative movement between a vehicle body and a wheel assembly may be caused. In one embodiment, the relative movement between the vehicle body and the wheel assembly can be detected by sensor 280. Particularly, an amount of displacement of the vehicle body and/or an amount of displacement of the wheel assembly can be sensed by sensor 280 to detect the relative movement. Then, a detection value representing the relative movement is produced by sensor 280 (S510). The detection value is sent to controller 290. Controller 290 may control (or instruct) electromagnetic generator 130 (or electromagnetic generators 130-1 to 130-4) to operate in response to the detection value from sensor 280 (S520). For example, when controller 290 receives the detection value from sensor 280, controller 290 instructs electromagnetic generator 130 (or electromagnetic generators 130-1 to 130-4) to have exciter 125 to apply the exciting voltage between both ends of coil 120 such that electromagnetic generator 130 (or electromagnetic generators 130-1 to 130-4) initiates its operation. The relative movement between the vehicle body and the wheel assembly is converted to an electrical energy by electromagnetic generator 130 (or electromagnetic generators 130-1 to 130-4), and thus, the relative movement between the vehicle body and the wheel assembly can be attenuated (S530). The electrical energy is stored in storage device 140 capable of being instantaneously charged and discharged (S540). In some embodiments, prior to storing the electrical energy in storage device 140, an output voltage of electromagnetic generator 130 (or electromagnetic generators 130-1 to 130-4) can be converted to an allowable range of an input voltage for storage device 140 by DC-to-DC converter 250. The electrical energy stored in storage device 140 can be used to drive and/or to operate the vehicle or can be transferred to battery 270. In some embodiments, prior to transferring the electrical energy from storage device 140 to battery 270, an output voltage of storage device 140 can be converted to an allowable range of an input voltage for battery 270 by DC-to-DC converter 260.

Accordingly, the generation of the electrical energy by electromagnetic generator 130 (or electromagnetic generators 130-1 to 130-4) can allow the storage of the electrical energy to be used to drive and/or to operate a vehicle, as well as the attenuation of the relative movement between the vehicle body and the wheel assembly. In addition, the electrical energy generated by electromagnetic generator 130 (or electromagnetic generators 130-1 to 130-4) is stored in storage device 140 capable of being instantaneously charged and discharged so that the electrical energy can be stored instantaneously and the electrical energy stored in storage device 140 can be discharged instantaneously when necessary. Further, storage device 140 can allow repetitive charging and discharging without deteriorating the performance of storage device 140.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A suspension system for a vehicle, comprising:
   an electromagnetic generator configured to generate an output signal in response to a relative movement between a vehicle body and a wheel assembly of the vehicle;
   an exciter configured to:
     apply an excitation voltage to the electromagnetic generator; and
     control a polarity of the excitation voltage such that a polarity of the output signal of the electromagnetic generator is maintained; and
   a storage device, coupled to the electromagnetic generator, configured to store electrical energy from the output signal generated from the electromagnetic generator, and configured to be instantaneously charged and discharged.

2. The system of claim 1, wherein the storage device comprises one or more ultracapacitors, or one or more electric double layer capacitors (ELDCs).

3. The system of claim 1, further comprising a DC-to-DC converter coupled between the electromagnetic generator and the storage device to convert an output voltage of the electromagnetic generator to an allowable range of an input voltage for the storage device.

4. The system of claim 3, wherein the allowable range of the input voltage for the storage device is between about 300 V to 400 V.

5. The system of claim 1, further comprising a sensor configured to detect the relative movement between the vehicle body and the wheel assembly.

6. The system of claim 5, further comprising a controller configured to control the electromagnetic generator to operate in response to the detected relative movement between the vehicle body and the wheel assembly.

7. The system of claim 1, wherein the electromagnetic generator comprises a permanent magnet enclosed with a coil and the exciter is configured to apply the excitation voltage between both ends of the coil.

8. The system of claim 7, wherein the permanent magnet is interlocked with the vehicle body and the coil is interlocked with the wheel assembly.

9. The system of claim 7, wherein the permanent magnet comprises a rare earth alloy magnet.

10. The system of claim 1, wherein the exciter applies a positive excitation voltage when the relative movement is in a first direction and applies a negative excitation voltage when the relative movement is in another direction.

11. An apparatus, comprising:
    an electromagnetic generator configured to generate an output signal in response to a relative movement between a first mechanical part and a second mechanical part such that the relative movement is attenuated by the generation of the output signal;
    an exciter configured to:
        apply an excitation voltage to the electromagnetic generator such that the electromagnetic generator is configured to generate the an output signal; and
        change a polarity of the excitation voltage in response to the relative movement to maintain a polarity of the output signal of the electromagnetic generator; and
    one or more ultracapacitors, coupled to the electromagnetic generator in parallel, configured to store the electrical energy from the output signal generated from the electromagnetic generator.

12. The apparatus of claim 11, further comprising a sensor configured to detect the relative movement between the first mechanical part and the second mechanical part.

13. The apparatus of claim 12, further comprising a controller configured to control the electromagnetic generator to operate in response to the detected relative movement.

14. The apparatus of claim 11, wherein the electromagnetic generator comprises a permanent magnet enclosed with a coil and the exciter is configured to apply the excitation voltage between both ends of the coil, and wherein the permanent magnet is interlocked with the first mechanical part and the coil is interlocked with the second mechanical part.

15. The apparatus of claim 11, wherein the apparatus comprises a shock absorber or a buffer.

16. A method for suspension, comprising:
    applying an excitation voltage to an electromagnetic generator, wherein the electromagnetic generator is arranged between a vehicle body and a wheel assembly of a vehicle;
    converting a relative movement between the vehicle body and the wheel assembly to an electrical energy in the electromagnetic generator;
    maintaining a polarity of an output signal of the electromagnetic generator by changing a polarity of the excitation voltage in response to the relative movement; and
    storing the electrical energy from the output signal, wherein the relative movement between the vehicle body and the wheel assembly of the vehicle is attenuated.

17. The method of claim 16, wherein converting the relative movement to the electrical energy comprises using an electromagnetic interaction between a magnet and a coil which are included in the vehicle such that the magnet is interlocked with the vehicle body and the coil is interlocked with the wheel assembly, in response to the relative movement; and converting the electromagnetic interaction to the electrical energy.

18. The method of claim 16, further comprising detecting the relative movement between the vehicle body and the wheel assembly by sensing an amount of displacement of the vehicle body and/or an amount of displacement of the wheel assembly, and producing a detection value representing the detected relative movement of the vehicle body with respect to the wheel assembly.

19. The method of claim 18, further comprising controlling the conversion of the relative movement to the electrical energy to be initiated in response to the detection value.

20. An apparatus, comprising:
    an electromagnetic generator configured to generate an output signal in response to a relative movement between a first mechanical part and a second mechanical part;
    a sensor configured to detect the relative movement between the first mechanical part and the second mechanical part;
    an exciter;
    a controller configured to:
        control the electromagnetic generator in response to the sensor detecting the relative movement by controlling the exciter to apply an excitation voltage to the electromagnetic generator; and
        maintain a polarity of an output signal of the electromagnetic generator; and
    a storage device, coupled to the electromagnetic generator, configured to store electrical energy from the output signal generated from the electromagnetic generator, and configured to be charged and discharged.

21. The apparatus of claim 20, wherein the electromagnetic generator comprises a permanent magnet enclosed with a coil, wherein the exciter is configured to apply the excitation voltage between both ends of the coil in response to the sensor detecting the relative movement.

22. The apparatus of claim 20, wherein the controller is configured to initiate operation of the electromagnetic generator upon receiving a detection value for the relative movement.

* * * * *

UNITED STATES PATENT AND TRADEMARK OFFICE
CERTIFICATE OF CORRECTION

Page 1 of 2

PATENT NO. : 8,513,824 B2
APPLICATION NO. : 12/725253
DATED : August 20, 2013
INVENTOR(S) : Sohn It is certified that error appears in the above-identified patent and that said Letters Patent is hereby corrected as shown below:

In the Specification

In Column 1, Line 37, delete "(ELDCs)." and insert -- (EDLCs). --, therefor.

In Column 3, Line 33, delete "body 112" and insert -- body 112, --, therefor.

In Column 4, Line 62, delete "(ELDC)," and insert -- (EDLC), --, therefor.

In Column 4, Line 63, delete "ELDC" and insert -- EDLC --, therefor.

In Column 4, Line 67, delete "ELDC" and insert -- EDLC --, therefor.

In Column 5, Line 2, delete "ELDC" and insert -- EDLC --, therefor.

In Column 5, Line 5, delete "ELDC," and insert -- EDLC, --, therefor.

In Column 5, Line 12, delete "ELDCs" and insert -- EDLCs --, therefor.

In Column 5, Line 14, delete "ELDCs" and insert -- EDLCs --, therefor.

In Column 5, Line 17, delete "ELDCs." and insert -- EDLCs. --, therefor.

In Column 7, Line 26, delete "(or ELDCs)" and insert -- (or EDLCs) --, therefor.

In Column 7, Line 61, delete "ELDC" and insert -- EDLC --, therefor.

In Column 7, Line 62, delete "ELDC" and insert -- EDLC --, therefor.

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,513,824 B2

In the Claims

In Column 10, Line 59, in Claim 2, delete "(ELDCs)." and insert -- (EDLCs). --, therefor.

In Column 11, Line 31, in Claim 11, delete "the an" and insert -- the --, therefor.